US 12,464,979 B2

(12) United States Patent
Vandike et al.

(10) Patent No.: US 12,464,979 B2
(45) Date of Patent: Nov. 11, 2025

(54) RESIDUE SPREAD CONTROL

(71) Applicant: Deere & Company, Moline, IL (US)

(72) Inventors: Nathan R. Vandike, Geneseo, IL (US); Noel W. Anderson, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 144 days.

(21) Appl. No.: 18/505,506

(22) Filed: Nov. 9, 2023

(65) Prior Publication Data

US 2025/0151647 A1    May 15, 2025

(51) Int. Cl.
*A01D 41/127*  (2006.01)
*A01D 91/04*   (2006.01)
*G05D 1/00*    (2024.01)

(52) U.S. Cl.
CPC .......... *A01D 41/127* (2013.01); *A01D 91/04* (2013.01); *G05D 1/0212* (2013.01)

(58) Field of Classification Search
CPC ..... A01D 41/127; A01D 91/04; G05D 1/0212
USPC ........................................................ 701/50
See application file for complete search history.

(56) References Cited

U.S. PATENT DOCUMENTS

| | | | |
|---|---|---|---|
| 8,527,453 B2 | 9/2013 | Garate Alvaro | |
| 8,924,030 B2 | 12/2014 | Wendte et al. | |
| 9,250,035 B2 | 2/2016 | Sullivan et al. | |
| 9,644,610 B2 | 5/2017 | Dalsgaard et al. | |
| 11,120,699 B2 | 9/2021 | Connor | |
| 11,224,170 B2* | 1/2022 | Dighton | A01D 45/10 |
| 11,408,196 B2 | 8/2022 | Cogburn | |
| 11,499,295 B2 | 11/2022 | Anderson | |
| 11,656,632 B2 | 5/2023 | Kearney-Fischer | |
| 11,674,288 B2 | 6/2023 | Anderson et al. | |
| 2017/0082442 A1* | 3/2017 | Anderson | A01B 69/007 |
| 2017/0241405 A1 | 8/2017 | Kruger et al. | |
| 2017/0251589 A1* | 9/2017 | Tippery | A01B 3/50 |
| 2020/0359550 A1* | 11/2020 | Tran | G06Q 30/0206 |
| 2020/0375083 A1 | 12/2020 | Anderson et al. | |
| 2020/0378088 A1* | 12/2020 | Anderson | G05D 1/0022 |
| 2021/0195839 A1 | 7/2021 | Koch et al. | |
| 2021/0400870 A1 | 12/2021 | Sunil et al. | |
| 2022/0232768 A1* | 7/2022 | Craig | A01D 41/1276 |
| 2022/0369552 A1 | 11/2022 | Christiansen et al. | |
| 2022/0369553 A1 | 11/2022 | Christiansen et al. | |
| 2022/0369554 A1 | 11/2022 | Christiansen et al. | |
| 2022/0375228 A1 | 11/2022 | Christiansen et al. | |
| 2022/0394923 A1 | 12/2022 | Christiansen et al. | |
| 2022/0394924 A1 | 12/2022 | Christiansen et al. | |

(Continued)

FOREIGN PATENT DOCUMENTS

BR    102021011031 A2    1/2022
CN       114462684 A     5/2022

(Continued)

*Primary Examiner* — Yazan A Soofi
(74) *Attorney, Agent, or Firm* — Christopher J. Volkmann; KELLY, HOLT & CHRISTENSON PLLC

(57) ABSTRACT

A sensor senses wind direction and generates a sensor signal. A wind processor processes the sensor signal to identify a wind direction at a location of an agricultural harvester. An action signal is generated to control the agricultural harvester to avoid discharging residue from the agricultural harvester into unharvested crop, based upon the wind direction.

20 Claims, 14 Drawing Sheets

(56) References Cited

U.S. PATENT DOCUMENTS

2022/0397417 A1   12/2022   Christiansen et al.
2023/0076216 A1*  3/2023   Ghrous ................ A01C 21/007

FOREIGN PATENT DOCUMENTS

| | | |
|---|---|---|
| EP | 4091422 A1 | 11/2022 |
| EP | 4091423 A1 | 11/2022 |
| EP | 4091424 A1 | 11/2022 |
| EP | 4094564 A1 | 11/2022 |
| EP | 4101262 A1 | 12/2022 |
| EP | 4101283 A1 | 12/2022 |
| EP | 4104665 A1 | 12/2022 |
| EP | 3845050 A1 | 11/2023 |
| GB | 2108224 A | 5/1983 |
| GB | 202108227 | 7/2021 |
| GB | 2606740 A | 11/2022 |
| GB | 2606741 | 11/2022 |
| WO | 2022243785 A1 | 11/2022 |
| WO | 2022243786 A1 | 11/2022 |

* cited by examiner

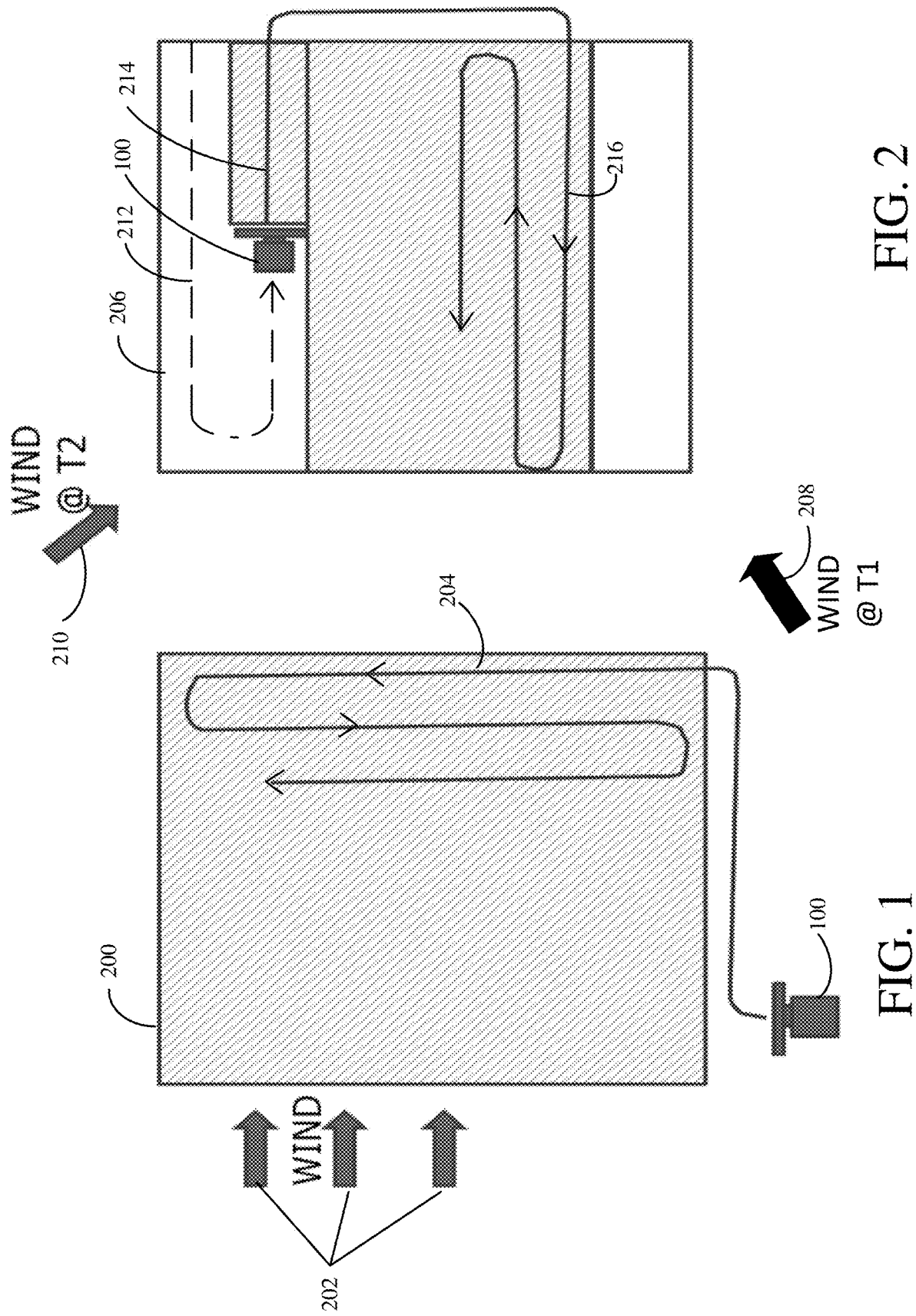

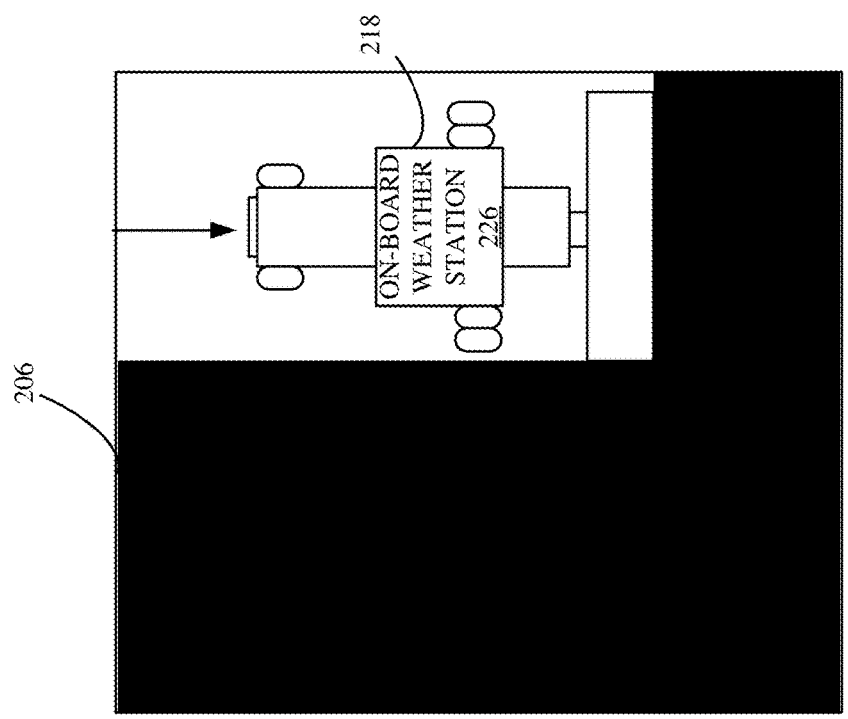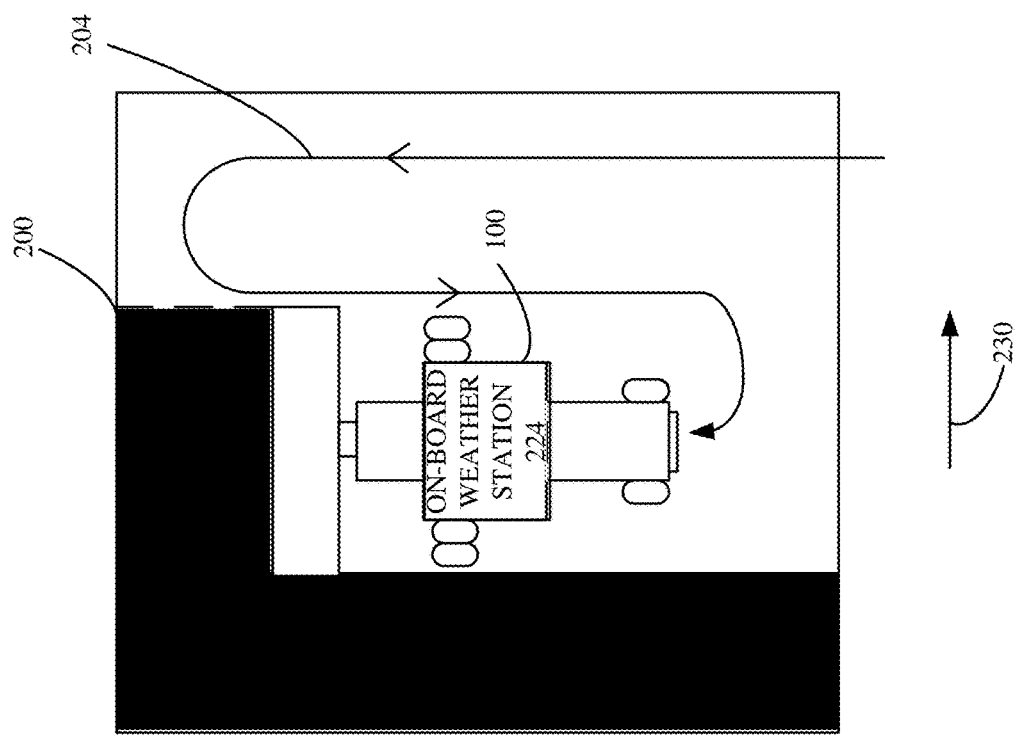
FIG. 4

RESIDUE SPREAD CONTROL

FIELD OF THE DESCRIPTION

The present description relates to controlling agricultural equipment. More specifically, the present description relates to controlling residue spreading to avoid spreading residue on unharvested portions of a field.

BACKGROUND

There are a wide variety of different types of agricultural equipment. Some such equipment includes harvesters that harvest crop material from a field and that spreads or discharges 8 residue from the harvested crop.

Some such agricultural machines have controllable discharge mechanisms for discharging residue. For instance, in one example, the speed of the discharge mechanism can be controlled. In another example, the discharge mechanism can be controlled to adjust the direction that residue is discharged from the machine and/or the spread of the residue as it is discharged from the machine.

The discussion above is merely provided for general background information and is not intended to be used as an aid in determining the scope of the claimed subject matter.

SUMMARY

A sensor senses wind direction and generates a sensor signal. A wind processor processes the sensor signal to identify a wind direction at a location of an agricultural harvester. An action signal is generated to control the agricultural harvester to avoid discharging residue from the agricultural harvester into unharvested crop, based upon the wind direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 1 is a pictorial illustration showing one example of a field with wind direction illustrated and with a harvesting route also illustrated.

FIG. 2 is a pictorial illustration showing an example of a field showing two different wind directions and two different harvesting routes.

FIG. 4 is a partial pictorial, partial block diagram showing a plurality of harvesters operating at a plurality of different harvesting sites with on-board weather stations.

DETAILED DESCRIPTION

Figure 3:
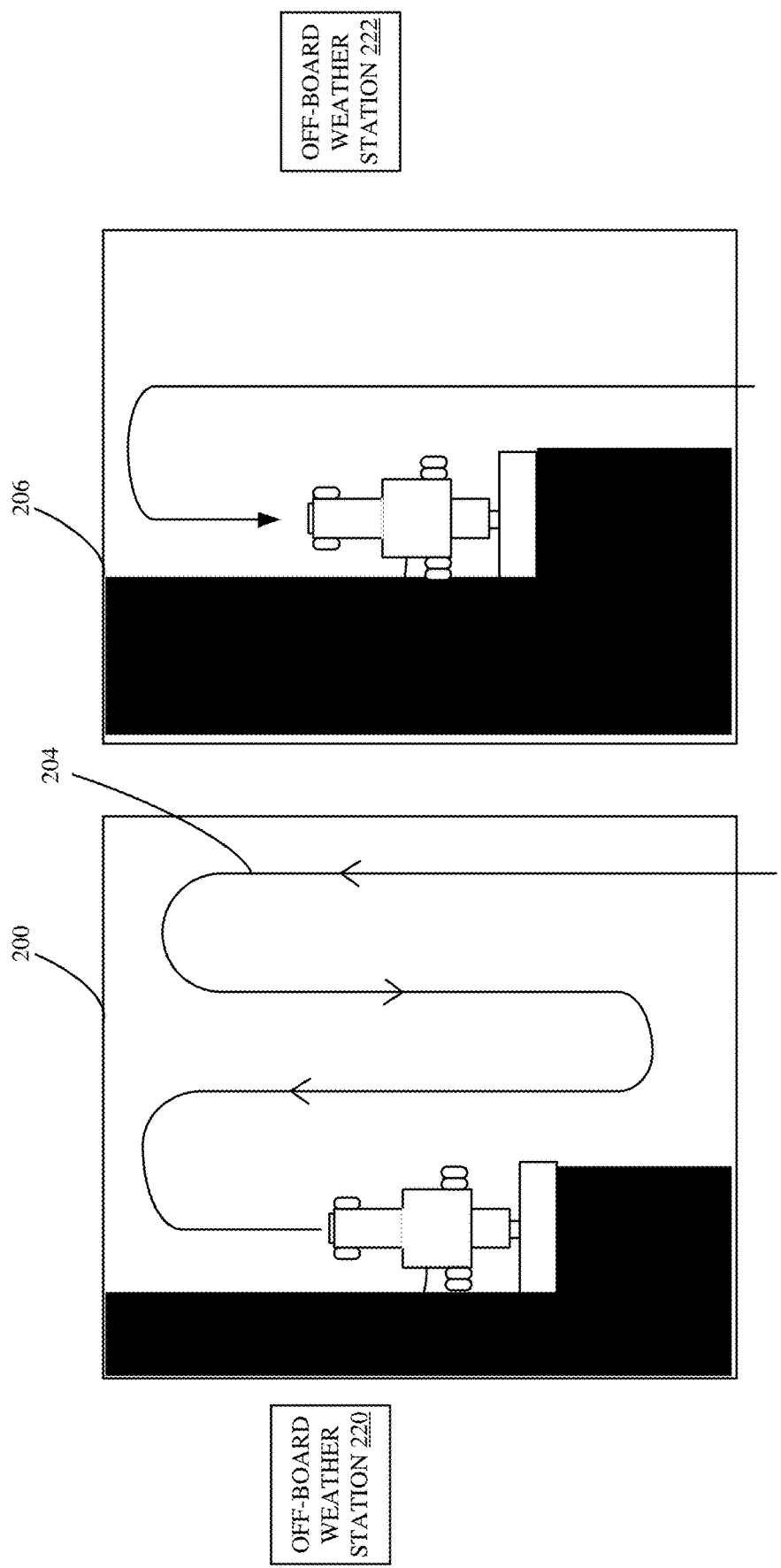
FIG. 3 is a partial pictorial, partial block diagram showing a plurality of agricultural harvesters operating at different harvesting sites, along with a plurality of off-board weather stations.

As discussed above, there are a wide variety of different types of agricultural machines, including agricultural harvesters. Many agricultural harvesters harvest crop material from a field and discharge residue. The mechanisms for discharging residue may be controllable to control the speed or trajectory of the discharged residue, or the direction or degree of spread of the residue as it is discharged from the agricultural harvester.

It can be desirable to evenly distribute the residue throughout the field. If the residue is aggregated or unevenly distributed in certain portions of the field, then during the next planting season, there will be a larger amount of undecayed residue in those parts of the field than in other parts of the field. This can cause problems in the subsequent planting operation and during the subsequent growing season.

Also, it can be important to avoid discharging residue into unharvested areas of the field. If residue is discharged into standing crop, for instance, then when the harvester harvests that standing crop, the residue can cause plugs or other deleterious operating conditions for the harvester.

Further, it can difficult to control where residue lands during windy conditions. For instance, as the harvester is harvesting a field, the wind may blow the residue into adjacent, unharvested crop areas of the field.

The present description thus describes a system in which wind direction can be sensed. A harvester is then controlled based upon the sensed wind direction. For instance, the residue discharge mechanisms or subsystem on the harvester can be controlled to control the trajectory and/or direction of discharge of residue from the harvester, based upon the sensed wind direction. In another example, a route planning system can plan a harvesting route, based on the sensed wind direction, in order to avoid residue being blown into unharvested areas of the field, and the harvester can be manually or automatically navigated along the harvesting route.

Further, the present description describes a system in which wind direction can be sensed at multiple different locations and then the direction of the wind can be interpolated to obtain an estimate of wind direction at the location of the agricultural harvester. Wind gusts can also be sensed and the harvester can be controlled to mitigate the effects of the wind gusts. Further, the present description describes a system in which multiple harvesters can be controlled so that residue from one of the harvesters does not deleteriously impact or impede the harvesting operation by the other harvester. Further, the harvesting machines may have on-board wind sensors and may communicate with one another. Without limitation, on-board and off-board wind sensors May comprise mechanical sensors such as wind vanes and cup anemometers, differential thermal sensors, Doppler sensors, and optical sensors such as cameras with processors that can infer wind parameters from particle trajectories. Each of the harvesters can be controlled based upon the wind direction sensed on the other harvester.

FIG. 1 is a pictorial illustration of a harvester 100 that is about to begin harvesting a field 200. The wind is in the direction indicated by arrows 202 in FIG. 1. In FIG. 1, a route planning system can plan a harvesting route indicated by line 204. Thus, as harvester 100 harvests along route 204, the wind 202 will blow the residue (which exits out the back of harvester 100) in a direction that is away from the unharvested crop. Similarly, if the unharvested crop is tall enough, the unharvested crop can act as a wind break to mitigate the displacement of residue by the wind 202. That is, as harvester 100 is harvesting along route 204, harvester 100 is sheltered from the wind, somewhat, by the standing crop which is in the direction upwind of the harvester 100.

FIG. 2 is a pictorial illustration showing one example of harvester 100 harvesting a field 206. In FIG. 2, the wind, at a first time period T1, is in the direction indicated by arrow 208. Then, at a second time period T2, the wind changes direction to the direction indicated by arrow 210. Therefore, during the first time period T1, harvester 100 harvests the field 206 along the route 6 indicated by dashed line 212, and solid line 214 (the dashed line indicating an already-harvested 7 area of the field 206, and the solid line 214 indicating the route along an unharvested portion of field 206). Then, at time T2, when the wind direction changes to that indicated by arrow 210, harvester 100 can transition to a second route indicated by line 216. When harvesting along the route indicated by lines 212 and 214, the wind in the direction indicated by arrow 208 will not blow residue onto unharvested crop because the unharvested crop is up wind of the harvester. However, if harvester 100 continued harvesting along the route 214 when the wind changed to the direction indicated by arrow 210, then residue would blow from harvester 100 onto the unharvested crop in field 206 because the unharvested crop would be downwind of harvester 100. Therefore, harvester 100 senses (or receives a signal indicative of) the change in wind direction and, when the wind changes direction, begins harvesting along route 216 so that the residue being discharged by harvester 100 will not blow into the unharvested areas of field 206.

It will be noted that, in both FIGS. 1 and 2, harvester 100 can have an on-board wind sensor that senses the direction (and, for example, speed) of the wind. In another example, harvester 100 can have a communication system that communicates with one or more weather stations or with other machines or with another remotely located wind sensor to identify the wind direction.

FIG. 3 shows an example in which the two fields 200 and 206 are being simultaneously harvested by two different harvesters 100 and 218, respectively. Also, in the example shown in FIG. 3, there are a plurality of different off-board weather stations 220 and 222 which are located on opposite sides of the fields 200 and 206. The weather stations 220, 222 include wind sensors that sense the wind direction at the location of the off-board weather stations 220 and 222. In one example, the harvesters 100, 218 receive signals from the weather stations 220 and 222 that indicate the location of the weather stations 220 and 222 as well as the wind direction sensed at the corresponding weather station 220, 222. In such a case, the harvesters 100 and 218 can estimate the wind direction at their own locations based upon the wind directions sensed at weather stations 220 and 222. For instance, harvester 100 can include a position sensor that indicates the position of harvester 100. Harvester 100 can then interpolate the wind direction (and other wind data) based on the wind signals received from weather station 220 and 222. Similarly, harvester 218 can also include a position sensor that senses its position. Harvester 218 can then estimate the wind direction at the location of harvester 218 by interpolating between the wind directions sensed at weather stations 220 and 222.

FIG. 4 is also a partial pictorial, partial block diagram showing fields 200 and 206 with harvesters 100 and 218. However, in the example shown in FIG. 4, harvester 100 includes an on-board weather sensor 224, and harvester 218 includes an on-board weather station 226. Weather stations 224 and 226 can include wind sensors that sense the direction and speed of the wind at the location of the harvesters on which the weather stations are deployed. Also, in one example, harvesters 100 and 218 include communication systems so that harvester 100 can communicate to harvester 218 the wind data sensed by weather station 224. Similarly, harvester 218 can communicate to harvester 100 the wind data sensed by weather station 226. This type of data can be used for controlling the harvesters in a variety of different ways.

For instance, not only can the route that the harvesters 100, 218 take through the corresponding fields be calculated based upon the wind direction sensed by the two harvesters, but wind gust processing can also be performed. For instance, if the wind is generally in the direction indicated by arrow 230, and weather station 224 senses a gust of wind (e.g., the direction and wind speed), wind data indicative of that gust can be communicated to harvester 218 so that harvester 218 can estimate when the wind gust will reach harvester 218. Harvester 218 can then control the discharge of residue accordingly. By way of example, just prior to the gust reaching harvester 218, the discharge mechanism on harvester 218 can be changed to modify the direction of the residue that is being discharged, the spread of the discharged residue, the speed at which the residue is being discharged, etc.

Figure 5:
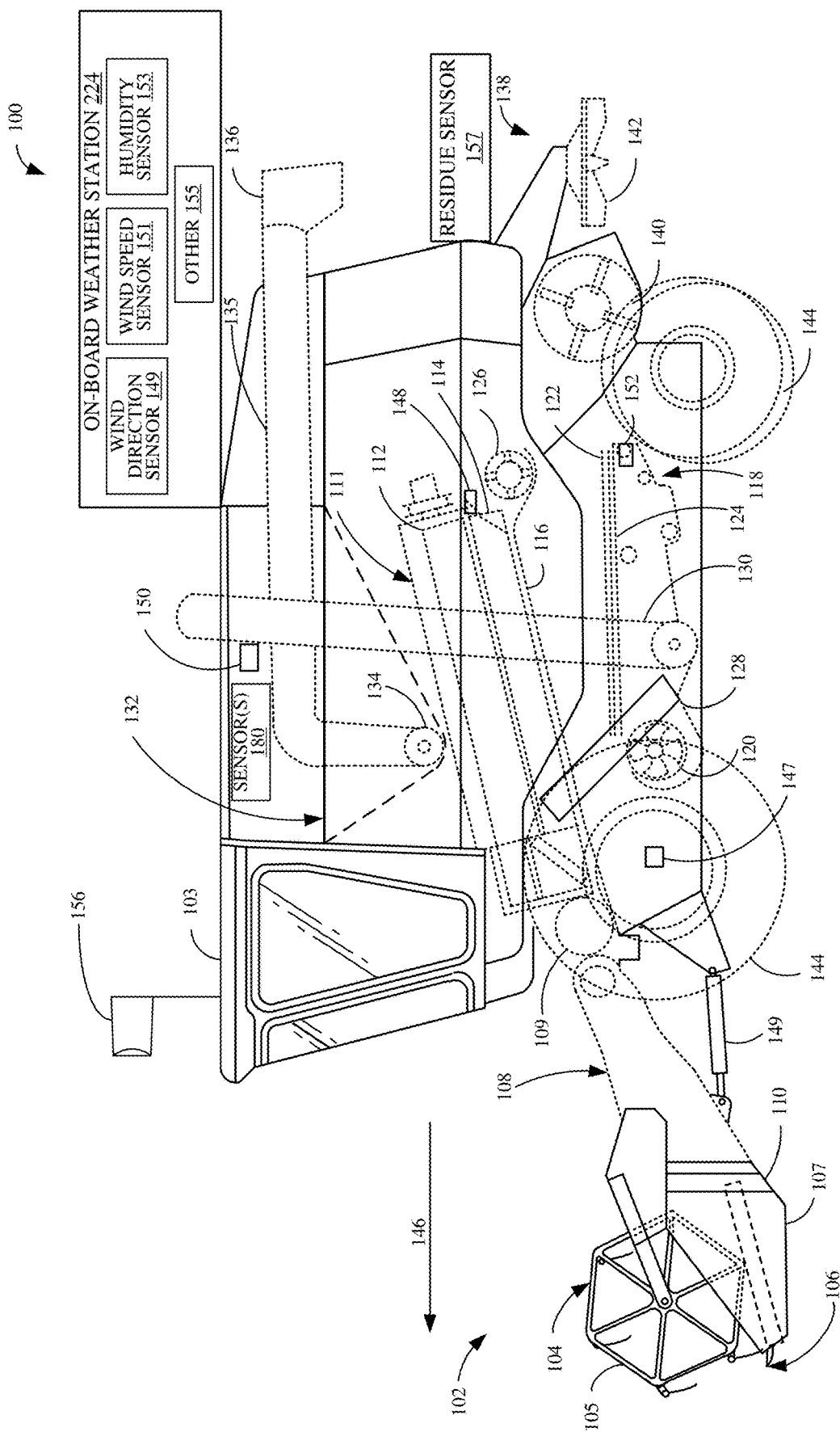
FIG. 5 is a partial pictorial, partial block diagram of one example of a harvester.

FIG. 5 is a partial pictorial, partial schematic, illustration of a mobile agricultural machine 100, in an example where mobile machine 100 is an agricultural harvester (also referred to as mobile agricultural machine 100 or harvester 100). It can be seen in FIG. 5 that mobile agricultural machine 100 illustratively includes an operator compartment 103, which can have a variety of different operator interface mechanisms for controlling agricultural harvester 100. Operator compartment 103 can include one or more operator interface mechanisms that allow an operator to control and manipulate agricultural harvester 100. The operator interface mechanisms in operator compartment 103 can be any of a wide variety of different types of mechanisms. For instance, the mechanisms can include one or more input mechanisms such as steering wheels, levers, joysticks, buttons, pedals, switches, etc. In addition, operator compartment 103 may include one or more operator interface display devices, such as monitors, or mobile devices that are supported within operator compartment 103. In that case, the operator interface mechanisms can also include one or more user actuatable elements displayed on the display devices, such as icons, links, buttons, etc. The operator interface mechanisms can include one or more microphones where speech recognition is provided on agricultural harvester 100. The operator interface mechanisms can also include one or more audio interface mechanisms (such as speakers), one or more haptic interface mechanisms and/or a wide variety of other operator interface mechanisms. The operator interface mechanisms can include other output mechanisms as well, such as dials, gauges, meter outputs, lights, audible or visual alerts or haptic outputs, etc., and other input mechanisms as well.

Agricultural harvester 100 includes a set of front-end machines forming a cutting platform 102 that includes a header 104 having a cutter generally indicated at 106. Harvester 100 can also include a feeder house 108, a feed accelerator 109, and a thresher generally indicated at 111. Thresher 111 illustratively includes a threshing rotor 112 and a set of concaves 114. Further, agricultural harvester 100 can include a separator 116 that includes a separator rotor. Agricultural harvester 100 can include a cleaning subsystem (or cleaning shoe) 118 that, itself, can include a cleaning fan 120, a chaffer 122, and a sieve 124. The material handling subsystem in agricultural harvester 100 can include (in addition to a feeder house 108 and feed accelerator 109) discharge beater 126, tailings elevator 128, and clean grain elevator 130 (that moves clean grain into clean grain tank 132). Agricultural harvester 100 also includes a material transport subsystem that includes unloading auger 134, chute 135, spout 136, and can include one or more actuators that actuate movement of chute 135 or spout 136, or both, such that spout 136 can be positioned over an area in which grain is to be deposited. In operation, auger 134 causes grain from grain tank 132 to be conveyed through chute 135 and out of spout 136.

Agricultural harvester 100 can further include a residue subsystem 138 that can include chopper 140 and spreader 142. There are a variety of different types of residue subsystems 138. Some can include controllable items so the speed of spreader 142, the direction or trajectory of residue exiting machine 100, and/or other characteristics of residue subsystem 138 can be controlled. For instance, where two spreaders (e.g., left and right spreaders) 142 are provided, the spreaders may be separately controllable. Similarly, a set of fins or a shroud or other component can be controllable. By controlling, these or other items in residue subsystem 138, the trajectory, speed, and/or direction of residue exiting harvester 100 can be controlled. The residue subsystem 138 shown in FIG. 5 is shown for the sake of example only.

Agricultural harvester 100 can also have a propulsion subsystem that includes an engine (or other power source) that drives ground engaging elements 144 (such as wheels, tracks, etc.). It will be noted that agricultural harvester 100 can also have more than one of any of the subsystems mentioned above (such as left and right cleaning shoes, separators, spreaders, etc.).

As shown in FIG. 5, header 104 has a main frame 107 and an attachment frame 110. Header 104 is attached to feeder house 108 by an attachment mechanism on attachment frame 110 that cooperates with an attachment mechanism on feeder house 108. Main frame 107 supports cutter 106 and reel 105 and is movable relative to attachment frame 110, such as by an actuator (not shown). Additionally, attachment frame 110 is movable, by operation of actuator 149, to controllably adjust the position of cutting platform 102 relative to the surface (e.g., field) over which agricultural harvester 100 travels in the direction indicated by arrow 146, and thus to controllably adjust a position of header 104 relative to the surface. In one example, main frame 107 and attachment frame 110 can be raised and lowered together to set a height of cutter 106 above the surface over which agricultural harvester 100 is traveling. In another example, main frame 107 can be tilted relative to attachment frame 110 to adjust a tilt angle with which cutter 106 engages the crop on the surface. Also, in one example, main frame 107 can be rotated or otherwise moveable relative to attachment frame 110 to improve ground following performance. In this way, the roll, pitch, and/or yaw of the header relative to the agricultural surface can be controllably adjusted. The movement of main frame 107 together with attachment frame 110 can be driven by actuators (such as hydraulic, pneumatic, mechanical, electromechanical, or electrical actuators, as well as various other actuators) based on operator inputs or automated inputs.

In operation, and by way of overview, the height of header 104 is set and agricultural harvester 100 illustratively moves over a field in the direction indicated by arrow 146. As harvester 100 moves, header 104 engages the crop to be harvested and gathers the crop towards cutter 106. After the crop is cut, the crop can be engaged by reel 105 which moves the crop to a feeding system. The feeding system moves the crop to the center of header 104 and then through a center feeding system in feeder house 108 toward feed accelerator 109, which accelerates the crop into thresher 111. The crop is then threshed by rotor 112 rotating the crop against concaves 114. The threshed crop is moved by a separator rotor in separator 116 where some of the residue is moved by discharge beater 126 toward the residue subsystem 138. The residue can be chopped by residue chopper 140 and spread on the field by spreader 142. In other implementations, a tailboard with a shroud or fins can be used to direct the residue in a desired direction as the residue exists harvester 100. In still other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits the clean grain in clean grain tank 132. Residue can be removed from the cleaning shoe 118 by airflow generated by cleaning fan 120. That residue can also be moved rearwardly in harvester 100 toward the residue subsystem 138 where the residue is discharged.

Tailings can be moved by tailings elevator 128 back to thresher 111 where the tailings can be re-threshed. Alternatively, the tailings can also be passed to a separate re-threshing mechanism (also using a tailings elevator or another transport mechanism) where the tailings can be re-threshed as well.

FIG. 5 also shows that, in one example, agricultural harvester 100 can include a variety of sensors, some of which are illustratively shown. For example, harvester 100 can include ground speed sensors 147, on-board weather station 224 (which can include wind direction sensor 149, wind speed sensor 151, humidity sensor 153, and other weather station sensors(s) and/or functionality 155), one or more separator loss sensors 148, a fill level sensor 150, one or more cleaning shoe loss sensors 152, one or more crop sensors 156, residue sensor(s) 157, where sensors 156 and/or 157 may be perception systems (e.g., lidar, radar, etc., an imaging system such as a camera, as well as various other sensor systems), and one or more position sensors 180. Ground speed sensor 147 illustratively senses the travel speed of harvester 100 over the ground. Sensing ground speed can be done by sensing the speed of rotation of ground engaging elements 144, the drive shaft, the axle, or various other components. The travel speed can also be sensed by position sensor 180, such as a global positioning system (GPS), another global navigation satellite system (GNSS), a cellular triangulation system, a dead-reckoning system, or a wide variety of other systems or sensors that provide an indication of position and harvester heading so that travel speed can be derived. Crop sensor 156 is mounted to and illustratively senses the field (and characteristics thereof) in front of and/or around (e.g., to the sides, behind, etc.) agricultural harvester 100 (relative to direction of travel 146) and generates sensor signal(s) (e.g., an image or other sensor signal) indicative of those characteristics. For example, crop sensor 156 can generate a sensor signal indicative of agricultural characteristics in the field ahead of and/or around agricultural harvester 100 such as whether the crop in the sensed region has already been harvested, etc. While shown in a specific location in FIG. 5, it will be noted that crop sensor 156 can be mounted to various locations on agricultural harvester 100 and is not limited to the depiction shown in FIG. 5. Additionally, while only one crop sensor 156 is illustrated, it will be noted that agricultural harvester 100 can include any number of crop sensors 156, mounted to any number of locations on agricultural harvester 100, and sensor(s) 156 can be configured to view in any number of directions around agricultural harvester 100. Also, instead of sensing whether crop is harvested in a specific location, harvester 100 can obtain that information from another source such as a coverage map that is generated to show where harvester 100, and other harvesters in the field, have already harvested material. These are examples only.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise a single sensor as well, instead of separate sensors for each shoe.

Separator loss sensors 148 provide signals indicative of grain loss in the left and right separators. The sensors associated with the left and right separators can provide separate grain loss signals or a combined or aggregate signal. Sensing loss can be done using a wide variety of different types of sensors as well. It will be noted that separator loss sensors 148 may also comprise a single sensor, instead of separate left and right sensors.

Fill level sensor 150 illustratively provides an output indicative of the fill level of the grain tank 132. Fill level sensor 150 can be any of a number of different types of sensors, such as an imaging system, an electromagnetic radiation sensor, a contact sensor, as well as various other types of sensors. Additionally, while only one fill level sensor 150 is shown, in other examples agricultural harvester 100 can include more than one fill level sensor 150 including multiple different fill level sensors 150 disposed at multiple different locations.

Residue sensor 157 senses residue as it exits harvester 100. Sensor 157 can generate a signal indicative of where the residue is landing, the trajectory of the residue, the speed of the residue, the spread of the residue, and/or other characteristics of the residue. The sensor signal can be processed (such as by an image processor or other processor) to obtain the indication of the sensed characteristic. In some examples, the analysis of the residue trajectory may be used to measure wind speed and direction.

It will be appreciated that agricultural harvester 100 can include a variety of other sensors not illustratively shown in FIG. 5 and/or the illustrated sensors may be eliminated, replaced by other sensors, combined, or arranged in other ways. For instance, agricultural harvester 100 can include residue setting sensors that are configured to sense whether agricultural harvester 100 is configured to chop the residue, drop a windrow, etc. The residue setting sensors can sense the spread of the residue, the speed of spreader(s) 142, and/or other residue characteristics from which the trajectory or landing point of the residue can be determined or estimated. The sensors can include cleaning shoe fan speed sensors that can be configured proximate fan 120 to sense the speed of the fan. The sensors can include threshing clearance sensors that sense clearance between the rotor 112 and concaves 114. The sensors can include threshing rotor speed sensors that sense a rotor speed of rotor 112. The sensors can include chaffer clearance sensors that sense the size of openings in chaffer 122. The sensors can include sieve clearance sensors that sense the size of openings in sieve 124. The sensors can include material other than grain (MOG) moisture sensors that can be configured to sense the moisture level of the material other than grain that is passing through agricultural harvester 100. The sensors can include machine settings sensors that are configured to sense the various configured settings on agricultural harvester 100. The sensors can also include machine orientation sensors that can be any of a wide variety of different types of sensors that sense the orientation of agricultural harvester 100, and/or components thereof. The sensors can include crop property sensors that can sense a variety of different types of crop properties, such as crop type, crop moisture, crop height, and other crop properties. The crop property sensors can also be configured to sense characteristics of the crop as they are being processed by agricultural harvester 100. For instance, the crop property sensors can sense grain feed rate, as it travels through clean grain elevator 130. The crop property sensors can sense mass flow rate of grain through elevator 130 or provide other output signals indicative of other sensed variables. Agricultural harvester 100 can include soil property sensors that can sense a variety of different types of soil properties, including, but not limited to, soil type, soil compaction, soil moisture, soil structure, among others.

Some additional examples of the types of sensors that can be used are described below, including, but not limited to a variety of position sensors that can generate sensor signals indicative of a position (e.g., geographic location, orientation, elevation, etc.) of agricultural harvester 100 on the field over which agricultural harvester 100 travels or a position of various components of agricultural harvester 100 (e.g., header 104) relative to, for example, the field over which agricultural harvester 100 travels.

Figure 6:
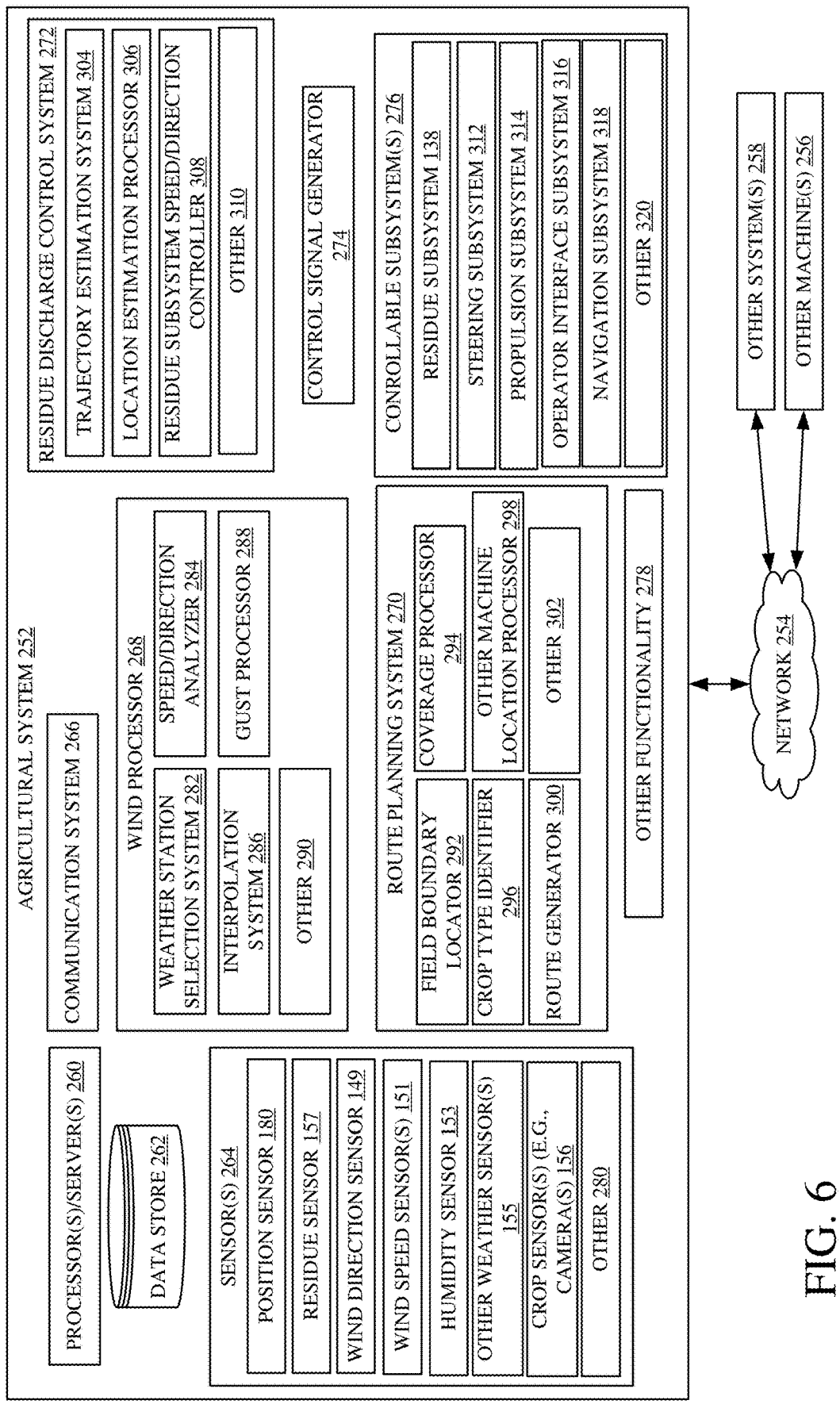
FIG. 6 is a block diagram of one example of an agricultural system.

FIG. 6 is a block diagram showing one example of an agricultural system architecture 250 in which an agricultural system 252 can be coupled over network 254 to one or other machines 256 and/or one or more other systems 258. In the example shown in FIG. 6, agricultural system 252 is disposed on harvester 100. However, it will be appreciated that different portions of agricultural system 252 can be disposed in different areas of architecture 250. For instance, agricultural system 252 can all be disposed on harvester 100, or system 252 can be dispersed among harvester 252 and other machines 256. The other machines 256 may include another harvester 218, or still other machines. In addition, agricultural system 252 can be dispersed among harvesters 100, 218, and/or other systems 258. Other systems 258 can be farm manager systems, vendor systems, or other systems. Such systems 258 may be local or remote, such as disposed in a remote server architecture (such as in the cloud), etc. Further, agricultural system 252 can all be located on harvester 100, but still dispersed among different processors and systems on harvester 100 (such as dispersed among a display control system, a mobile device, and/or other controllers or systems on harvester 100). Some of the items in FIG. 6 are similar to those shown in previous figures, and they are similarly numbered. Network 254 can be a wide area network, a local area network, a near field communication network, a Wi-Fi or Bluetooth network, a cellular network, or any of a wide variety of other networks or combinations of networks.

In the example shown in FIG. 6, agricultural system 252 includes one or more processors or servers 260, data store 262, one or more sensors 264, communication system 266, wind processor 268, route planning system 270, residue discharge control system 272, control signal generator 274, controllable subsystems 276, and any of a wide variety of other agricultural system functionality 278. Sensors 264 can be any of the sensors discussed above with respect to previous sensors, or other sensors. Therefore, sensors 264 can include position sensor 180, residue sensor 157, wind direction sensor 149, wind speed sensor 151, humidity sensor 153, other weather sensors 155, crop sensor (e.g., camera) 156, and any other of a wide variety of other sensors 280.

Wind processor 268 can receive a sensor signal and process that sensor signal to identify characteristics of any wind that is sensed. Wind processor 268 can include weather station selection system 282, speed/direction analyzer 284, interpolation system 286, gust processor 288, and other items 290.

Route planning system 270 can include field boundary locator 292, coverage processor 294, crop type identifier 296, other machine location processor 298, route generator 300, and other items 302. Residue discharge control system 272 can include trajectory estimation system 304, location estimation processor 306, residue subsystem speed/direction controller 308, and other items 310.

Controllable subsystems 276 can include residue subsystem 138, steering subsystem 312, propulsion subsystem 314, operator interface subsystem 316, navigation subsystem 318, and other items 320. Before describing the overall operation of agricultural system architecture 250 in more detail, a description of some of the items in architecture 250, and their operation, will first be provided.

Wind processor 268 receives one or more sensor signals and performs processing on those signals (and possibly other data) to identify the wind direction and possibly wind speed at a location where harvester 100 is harvesting. Station selection system 282 identifies a particular weather station or wind sensor that wind processor 268 will select in order to receive wind data. For instance, where there is more than one weather station available, station selection system 282 may select to receive wind data from a weather station that is closest to the current location of harvester 100, or that is upwind from harvester 100, or that is on the same side of a weather front as the harvester 100 (e.g., wind direction and speed can change on opposite sides of a weather front), or that is arranged in another location relative to harvester 100 (such as in a location that has no obstacles that would obstruct the wind, etc.). Further, the weather station may be on harvester 100 itself, on another harvester or other machine, etc. Similarly, station selection system 282 may select two or more different weather stations from which it will receive wind sensor data.

Based upon the sensor signals from the selected weather station(s), wind processor 268 can identify the wind direction and wind speed at the current location of harvester 100. Speed/direction analyzer 284 receives the sensor signals from the one or more selected weather stations or other wind sensors and identifies the wind speed and wind direction indicated by those signals. Interpolation system 286 can interpolate between the wind sensor signals from two or more different weather stations in order to identify a value corresponding to the wind speed and wind direction at the location of harvester 100. In some examples, interpolation system 286 may consider topography or ground cover in identifying a value corresponding to the wind speed and wind direction at the location of harvester 100. Gust processor 288 can process wind gust data. For instance, where a weather station is up wind of harvester 100, and that weather station detects a wind gust, then gust processor 288 can identify the time when the wind gust will be received at harvester 100 and the strength of the wind gust, from the corresponding sensor data and from the location of the selected weather station relative to the location of harvester 100. In some examples, gust processor 288 may consider topography or ground cover in estimating gust direction and speed when it arrives at harvester 100. In response, control signal generator 274 can generate control signals to mitigate the effect of the wind gust on the displacement of residue being discharged from harvester 100. Processing wind gust data is described in greater detail below, such as with respect to FIG. 9.

Based upon the speed and direction of the wind output by wind processor 268, route planning system 270 can generate a harvesting route. For instance, the route may be generated so that the wind is unlikely to blow residue into unharvested crop, into the path of another harvester, etc.

Field boundary locator 292 locates the boundary of the field that is to be harvested. The field boundary may be located based upon a current location of harvester 100 and a map for the field. The field boundary location can be identified based on an operator input, based upon an input from another machine, or in other ways. Coverage processor 294 identifies the particular areas of the field (defined by the field boundary) that have already been harvested (if any). For instance, as harvester 100 is harvesting the field, the geographic location of harvester 100 can be recorded, along with the width of the header 104, to identify parts of the field that have been harvested. This information can be used to update a coverage map as the harvesting operation is performed. Similarly, if multiple harvesters are harvesting the same field, the data from both harvesters can be used to update the coverage map so that the coverage map accurately identifies the portions of the field that have been harvested, and thus identifies the portions of the field that have unharvested crop. Similarly, coverage processor 294 may receive an input from crop sensor 156 (which may, for instance, be an optical image or another item) that generates a sensor signal indicative of whether the crop has been harvested. By way of example, if sensor 156 is configured to capture images of the field on either side of harvester 100, and in front of harvester 100, those images may be processed by coverage processor 294 to determine whether the crop in the captured images has already been harvested.

Crop type identifier 296 can identify the type of crop being harvested based upon an operator input, based upon historical data (which indicates what type of crop was planted there), based upon a sensor signal (such as by processing an image captured by crop sensor 156), or in other ways. The crop type may be used in generating a route for harvester 100. For instance, if the crop type is corn, then the corn may be tall enough to act as a wind break.

Therefore, the harvesting route may be generated based upon the fact that the unharvested crop will act as a wind break.

Other machine location processor 298 may receive information indicative of the past, present, or future location of other harvesters in the same field or in different fields. This May be used in a number of different ways. For instance, route planning system 270 may plan the route of harvester 100 so that it does not interfere with, or discharge residue into, the route of another harvester. Similarly, if the other harvester has a weather station located on it, then the wind data from that harvester, along with the location of that harvester, can be used by wind processor 268 and route planning system 270 to identify the wind speed and wind direction at the location of harvester 100 and to plan the route for harvester 100. Route generator 300 generates a harvesting route based upon the various information generated by sensors 264, wind processor 268, and other items in route planning system 270. The route is illustratively generated to avoid discharging residue into unharvested crop, and to avoid discharging residue and/or dust into the path of other machines operating in the same field.

Residue discharge control system 272 receives the wind data from wind processor 268 and controls residue subsystem 138 based on the wind data. For example, residue discharge control system 272 can identify where the residue is landing (or how it is being discharged) from harvester 100 and generate control signals to control the residue subsystem 138. The control signals can, for instance, control vanes on a tailboard or other directional baffles to direct the residue in one direction or another. The control signals can control the speed of the discharge beaters 142 to preferentially throw residue in one direction or another. The control signals can also control the speed of the discharge beaters 142 to change the trajectory of residue exiting harvester 100 so that the residue is more or less affected by a cross wind, for example. The control signals can be used to control residue subsystem 138 in other ways as well.

Trajectory estimation system 304 can obtain an input from sensors 264 and/or wind data from wind processor 268 and estimate or otherwise identify the trajectory of the residue as it is discharged from harvester 100. For instance, trajectory estimation system 304 can obtain a signal from a residue sensor 157 (e.g., a camera) and perform image processing on the sensor signal to identify the trajectory of the residue in a captured image. In another example, trajectory estimation system 304 can estimate the trajectory of the residue in other ways (such as based on the sensed speed of discharge spreaders 142, etc.).

Location estimation processor 306 can generate an output indicative of an estimated location where the residue is landing. The location where the residue is landing can be identified using coordinates in a local or global coordinate system, or in a relative way (e.g., relative to harvester 100, relative to unharvested crop, or relative to other items). Trajectory estimation system 304 and location estimation processor 306 can also estimate the trajectory and landing location of the residue based upon the location and heading of harvester 100, and also based upon the direction and speed of the wind as output by wind processor 268. Based upon the trajectory 21 and/or landing location of the residue, residue subsystem speed/direction controller 308 can generate an output that can be provided to control signal generator 274. The output from residue subsystem speed/direction controller 308 can identify how the speed and/or direction of residue subsystem 138 is to be controlled, given the sensed or estimated trajectory and landing location of the residue, based on the wind data, etc. For instance, if the residue is sensed or estimated to be landing on unharvested crop, then the output from controller 308 may indicate that the speed or direction of residue subsystem 138 is to be changed by a certain amount so that the residue no longer lands on the unharvested crop. The output from controller 308 can be provided to control signal generator 278 which, itself, generates control signals to control residue subsystem 138, as indicated by the output from residue subsystem speed/direction controller 308.

Steering subsystem 312 can control steerable elements, such as wheels, tracks, etc. Propulsion subsystem 314 can be an engine coupled to a transmission, individual motors that drive ground-engaging elements, or another propulsion subsystem. Navigation subsystem 318 can generate signals to navigate harvester 100 along a desired route (such as a route output by planning system 270). Operator interface subsystem 316 can include items mentioned above with respect to FIG. 5, or other items.

Figure 7A:
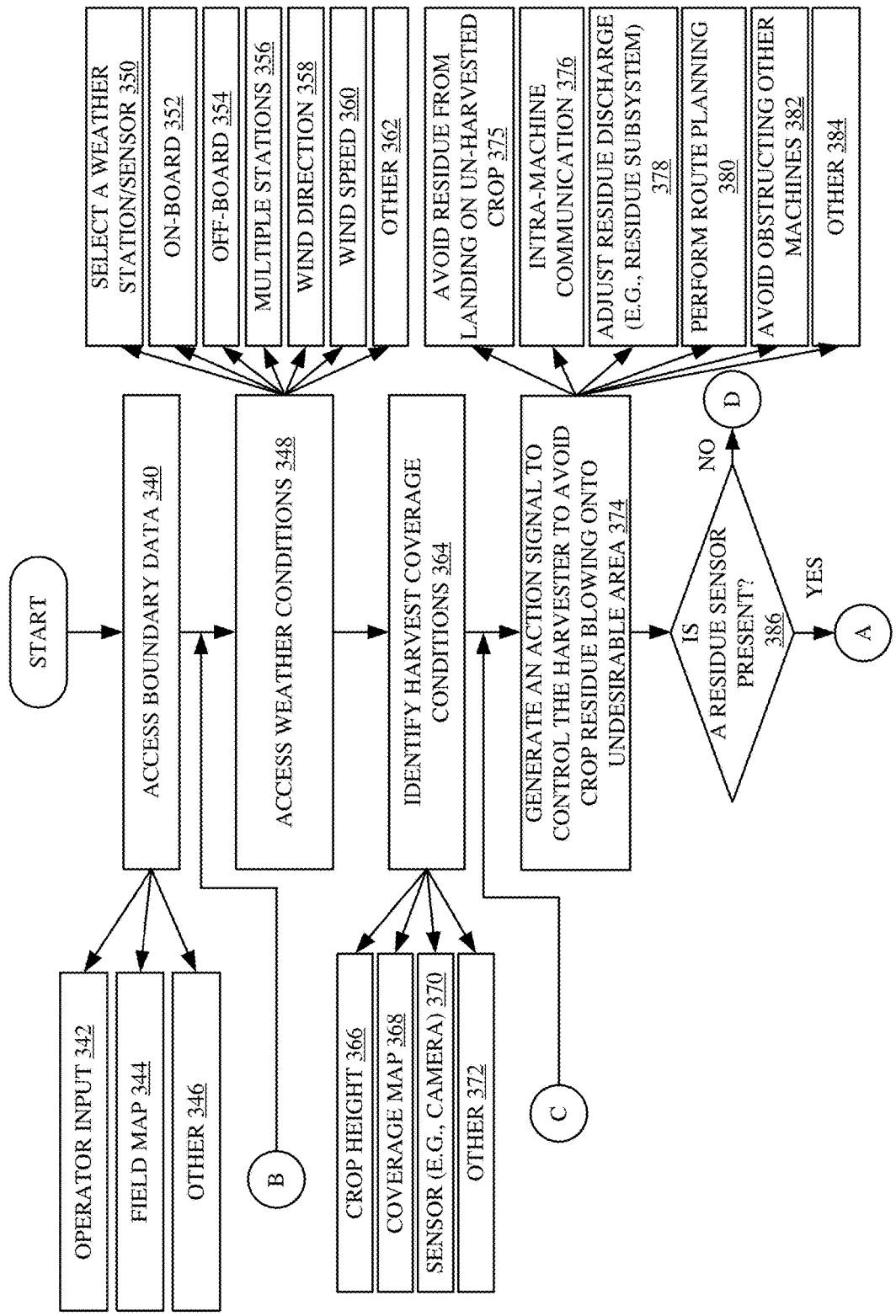
FIGS. 7A and 7B (collectively referred to herein as FIG. 7) show a flow diagram illustrating one example of the operation of the agricultural system.
Figure 7B:
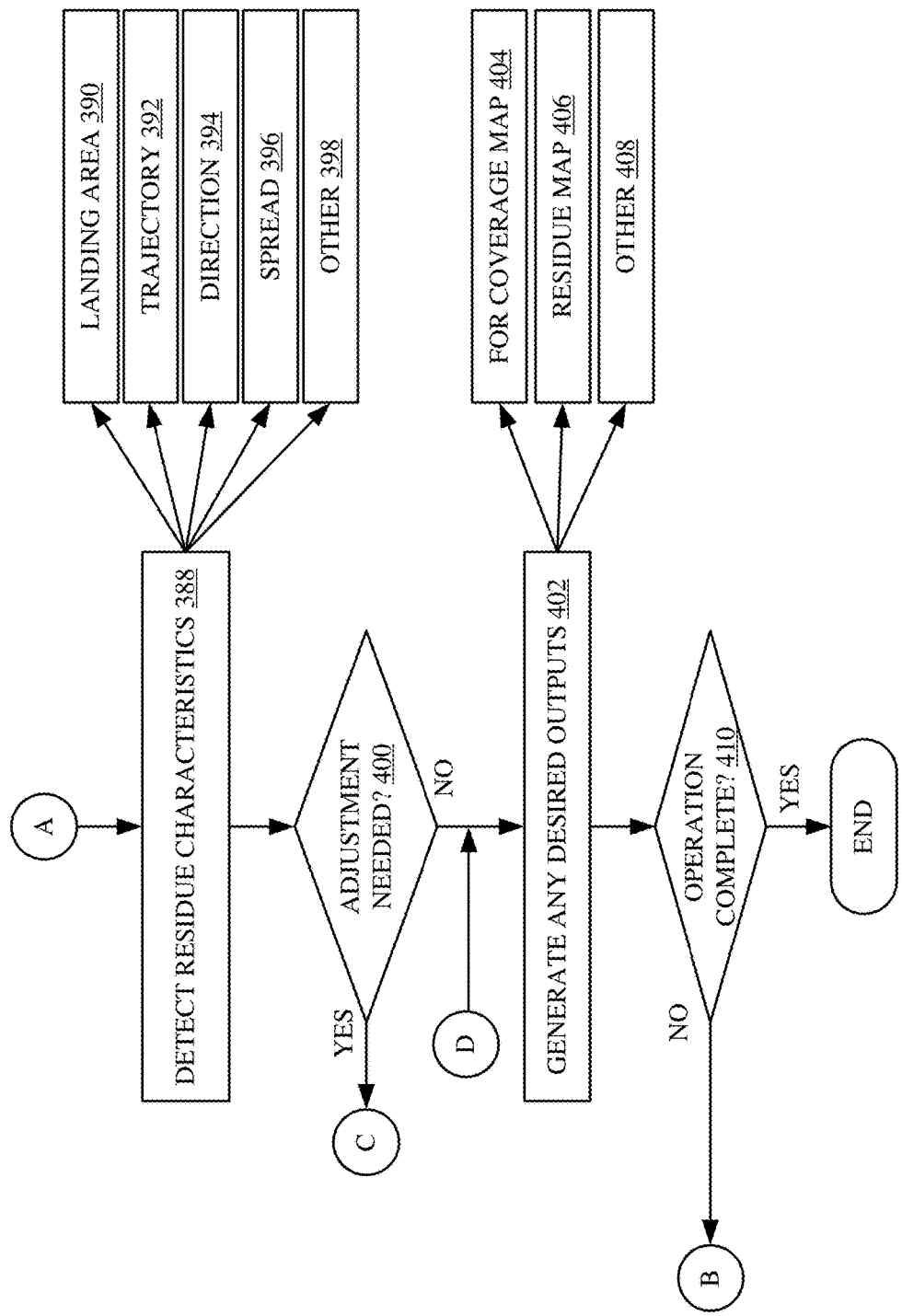

FIGS. 7A and 7B (collectively referred to herein as FIG. 7) show a flow diagram illustrating one example of the operation of agricultural system 252. In one example, field boundary locator 292 first accesses the field boundary data of the field being harvested. Accessing field boundary data to locate the field boundary is indicated by block 340 in the flow diagram of FIG. 7. In one example, the field boundary data can be provided by an operator input 342 or by accessing a field map 344 which may be stored in data store 262, or on another system 258 or another machine 256. The boundary data can be accessed in a wide variety of other ways as well, as indicated by block 346.

Wind processor 268 then accesses weather conditions, as indicated by block 348 in the flow diagram of FIG. 7. In one example, weather station selection system 282 selects a weather station from which to receive weather data, as indicated by block 350. The selected weather station can be on-board the harvester 100 as indicated by block 352 or an off-board weather station, as indicated by block 354. For instance, weather station selection system 282 can select the weather station closest to harvester 100, or a weather station that is located so that there are no obstacles (buildings, terrain, etc.) between the weather station and harvester 100, or up wind of harvester 100, or at another desired location. In another example, where, for instance, wind direction is to be interpolated, weather station selection system 282 can select multiple weather stations 356. For example, the topography or the location of other ground features that impact wind may influence which weather stations 356 are selected. The weather conditions that are accessed can include wind direction 358, wind speed 360, or other weather conditions 362.

Coverage processor 294 also identifies the harvest coverage conditions (such as where crop has been harvested relative to harvester 100). Identifying the harvest coverage conditions is indicated by block 364 in the flow diagram of FIG. 7. The coverage conditions can include a wide variety of information, such as crop height 366, a coverage map (showing where crop has been harvested) 368, conditions sensed by a coverage sensor (such as a camera that has a field of view proximate harvester 100 so that images captured by the camera can be processed to identify whether crop has been harvested). Identifying coverage conditions using a sensor (e.g., a camera) is indicated by block 370 in the flow diagram of FIG. 7. Harvest coverage conditions can include a wide variety of other conditions obtained in a wide variety of other ways, as indicated by block 372 in the flow diagram of FIG. 7.

Agricultural system 252 then generates an action signal to control the harvester 100 to avoid crop residue blowing onto an undesirable area, such as onto unharvested crop in the field. Generating an action signal is indicated by block 374 and generating the action signal to avoid residue landing on unharvested crop is indicated by block 375 in the flow diagram of FIG. 7. For instance, in one example, communication system 266 can perform inter-machine communication with other machines to identify where those machines have harvested crop, to identify the locations of those machines relative to the current machine, to identify wind conditions at other machines, among other things. Performing inter-machine communication is indicated by block 376. Residue discharge control system 272 can generate an output to control signal generator 274 so that control signal generator 274 controls residue subsystem 138 to adjust residue subsystem 138 to avoid discharging residue into unharvested crop, as indicated by block 378. For instance, the control signals can control the direction (or trajectory), speed, and/or spread of residue being discharged by residue subsystem 138. Route planning system 270 can perform route planning to identify a route that harvester 100 can use in order to avoid discharging residue into unharvested crop. For instance, the route may cause harvester 100 to harvest down wind of the unharvested crop so that the residue, when discharged by harvester 100, blows onto an area that has already been harvested. The route planning can also be performed to use standing crop as a wind break, or to avoid discharging residue into the path, or near, other harvesters or other vehicles on the field such as tractors, etc. Generating an action signal to perform route planning is indicated by block 380 and avoiding discharging residue to obstruct other machines is indicated by block 382. A wide variety of other action signals can be generated to perform other actions as well, as indicated by block 384.

In one example, a residue sensor 157 may be present which can be used to identify or estimate the actual trajectory and landing point of residue as it exits harvester 100. If a residue sensor is present, as determined by block 386 in FIG. 7, then residue discharge control system 272 uses that sensor to detect a characteristic of the residue, as it exits harvester 100, and to control residue subsystem 138 in a closed loop fashion. Detecting a characteristic of the residue is indicated by block 388 in the flow diagram of FIG. 7. For instance, trajectory estimation system 304 can, based on the residue sensor signal, generate an output indicative of the trajectory 392 of the residue. The trajectory may identify the direction 394 that the residue is following as it exits harvester 100. Location estimation processor 306 can generate an output indicative of where the residue is landing (e.g., the landing area), as indicated by block 390. The residue sensor 157 may also indicate the spread (the degree over which the residue is spread) as it exits harvester 100. Detecting the spread of residue is indicated by block 396. The residue sensor 157 can sense any of a wide variety of other residue characteristics 398 as well.

Based upon the actual trajectory and/or landing point and/or other sensed residue characteristic, systems 270 and 272 can determine whether an adjustment to the harvesting route or residue subsystem 138 is needed, as indicated by block 400 in the flow diagram of FIG. 7. For instance, if the residue is landing on unharvested crop, then residue subsystem speed/direction controller 308 can modify its output to change the speed and/or direction or degree of spread of the residue to avoid having the residue land in unharvested crop. Similarly, route generator 300 can generate a different route to avoid having the residue land in unharvested crop. Thus, if an adjustment is needed, processing reverts to block 374.

If no adjustment is needed, then control signal generator 274 can control communication system 266 or data store 268 or other items to generate any desired outputs, as indicated by block 402. For instance, an output can be generated that can be used to update a coverage map to indicate the area that has been harvested by harvester 100. Generating an output for a coverage map is indicated by block 404. An output can be generated indicating the location of where residue is landing during the harvesting operation so that the location of the residue can be mapped in a residue map. Generating an output to map the location of the residue is indicated by block 406. Outputs can be generated to other machines 256 or other systems, or in a wide variety of other ways, as indicated by block 408.

Until the operation is complete, as determined at block 410, processing reverts to block 348 where the weather conditions are again accessed (e.g., the wind speed and wind direction) so that control signals can be generated to control the route of harvester 100 and/or to control the direction of discharge of residue from harvester 100, in order to avoid discharging residue into unharvested areas of the field.

Figure 8:
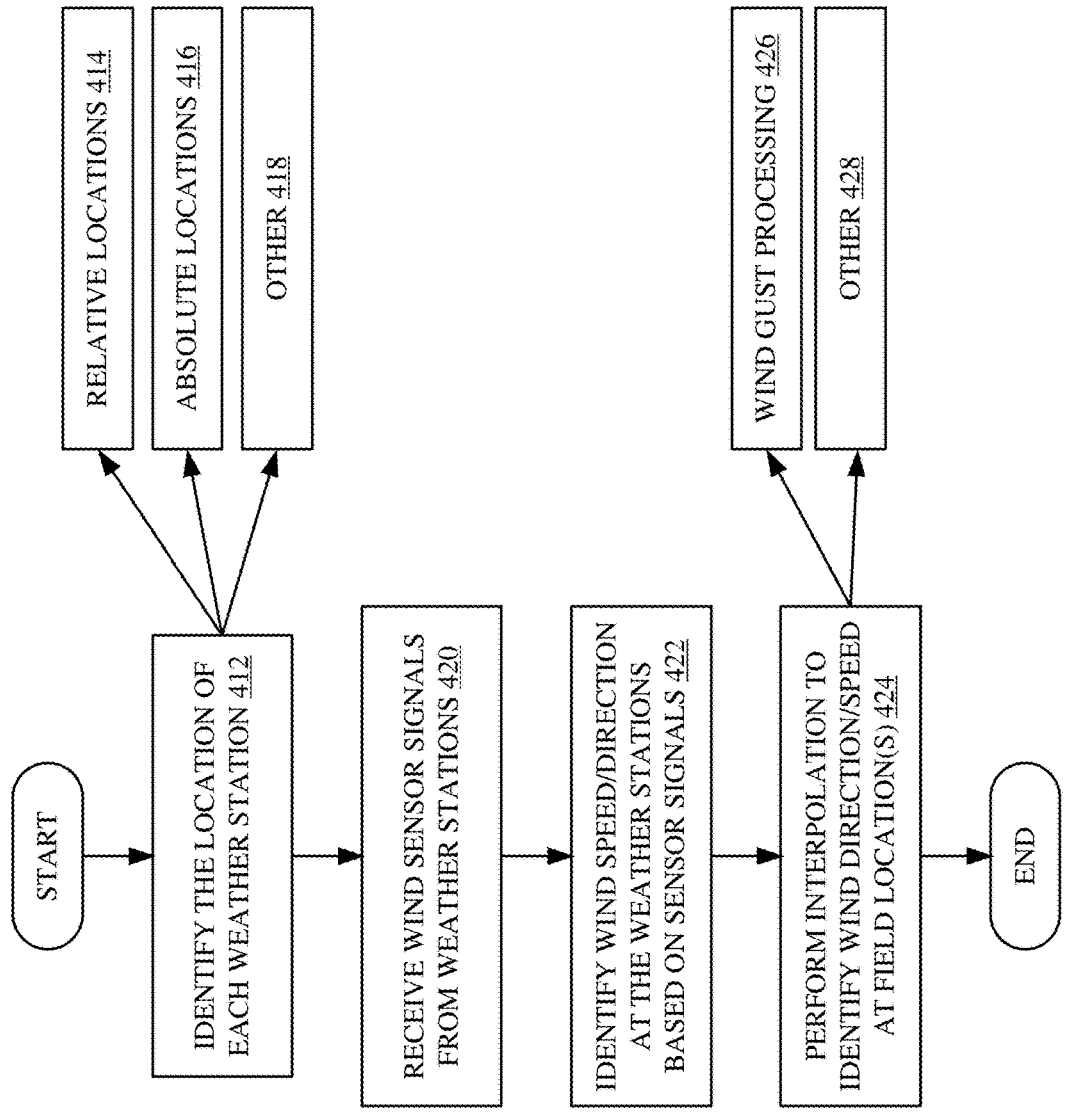
FIG. 8 is a flow diagram illustrating one example of the operation of the agricultural system in interpolating wind direction and wind speed at a field location.

FIG. 8 is a flow diagram illustrating one example of the operation of agricultural system 252 in using multiple off-board weather stations and interpolating weather conditions (e.g., wind direction and wind speed) at the location of a harvester 100. Weather station selection system 282 first identifies the location of each weather station from which weather data may be obtained. The weather stations, themselves, can transmit their own locations or the weather station locations can be obtained in other ways. Identifying the location of each weather station is indicated by block 412 in the flow diagram of FIG. 8. The location of the weather stations can be relative locations (e.g., relative to agricultural system 252, relative to agricultural harvester 100, etc.) as indicated by block 414. The location of the weather stations can be absolute locations based on the coordinates of the weather stations in a global or local coordinate system, as indicated by block 416. The location of each weather station can be identified in other ways, as indicated by block 418.

Speed/direction analyzer 284 then receives wind sensor signals from the selected weather stations, as indicated by block 420 in the flow diagram of FIG. 8. Speed/direction analyzer then identifies the wind speed and/or wind direction indicated by the sensor signals, as indicated by block 422.

Interpolation system 286 then performs interpolation using the wind speed and/or direction detected at the two selected weather stations in order to identify the wind direction and/or speed at the field location of the agricultural harvester 100. Performing interpolation to identify wind speed and direction is indicated by block 424 in the flow diagram of FIG. 8.

In one example, gust processor 288 can also perform wind gust processing to control the residue discharge at harvester 100 based upon wind gusts that are sensed at one or more of the selected weather stations. Performing wind gust processing is indicated by block 426 in the flow diagram of FIG. 8 and is described in greater detail below with respect to FIG. 9. Performing interpolation can be done in other ways, and used for other processing as well, as indicated by block 428.

Figure 9:
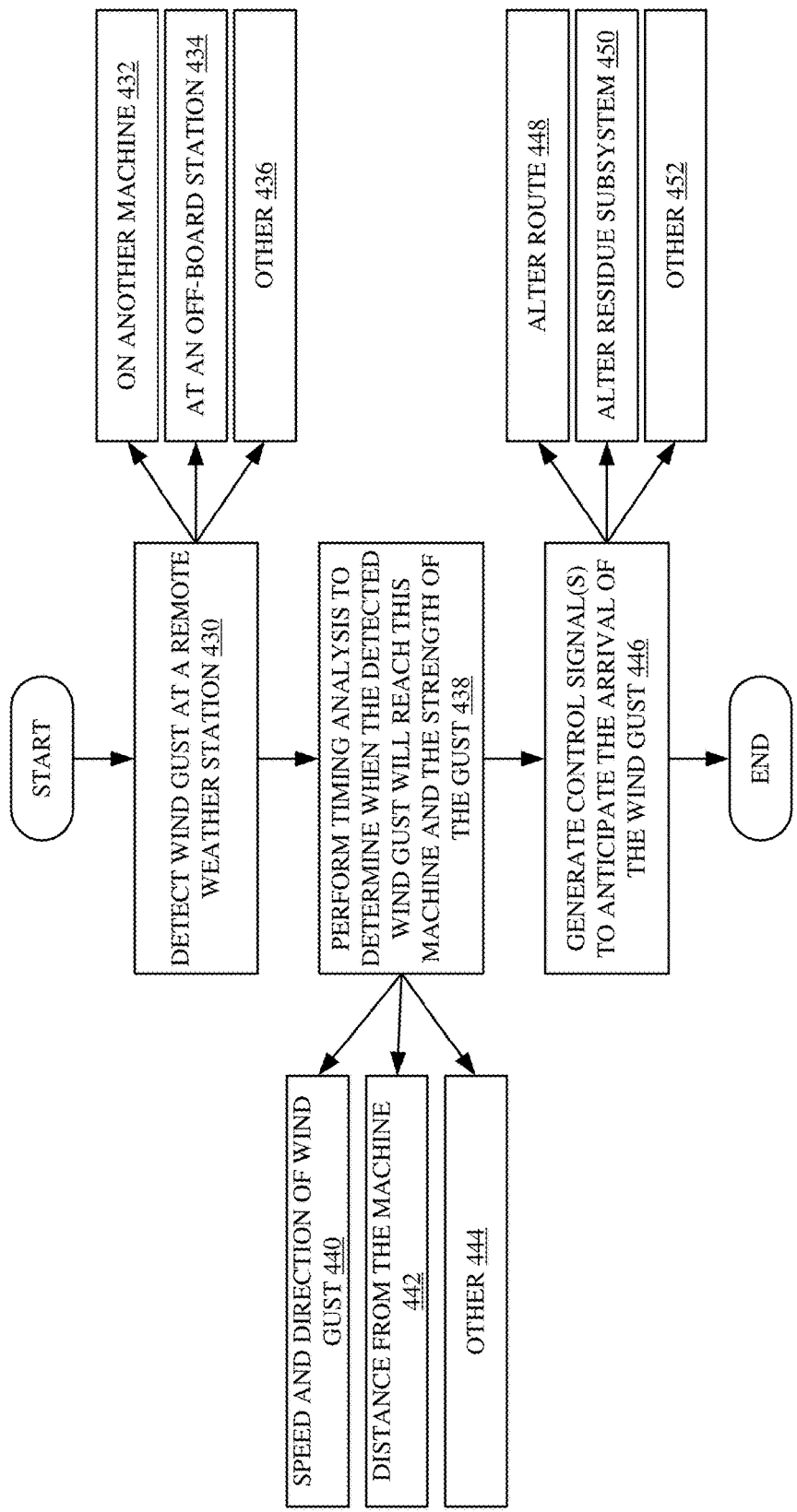
FIG. 9 is a flow diagram showing one example of processing wind gust information.

FIG. 9 is a flow diagram showing one example of how wind gusts can be processed. It is first assumed that one of the wind sensors detects a wind gust at a remote weather station, that is remote from the harvester 100. Detecting a wind gust at a remote weather station is indicated by block 430 in the flow diagram of FIG. 9. A wind gust may be wind that increases from an average wind speed by a threshold amount over a time period. The strength and duration of the wind gust can also be detected. In one example, the remote wind sensor is on another machine as indicated by block 432. In another example, the remote wind sensor is on an off-board weather station as indicated by block 434. The wind gust can be detected at a remote weather station in other ways as well, as indicated by block 436.

Gust processor 288 then performs a timing analysis to determine when the detected wind gust will reach this particular machine or harvester 100. Performing the timing analysis is indicated by block 438 in the flow diagram of FIG. 9. Detecting when the wind gust will reach the current machine may be based on the speed and direction of the wind gust indicated by the sensor signal, as indicated by block 440. The timing analysis can also be performed based upon the distance of the weather station from the current machine, as indicated by block 442. The timing analysis can be performed in other ways and be based on other criteria as well, as indicated by block 444. In some examples, gust processor 288 may also perform a gust intensity analysis based on the distance between the remote weather station and the machine, land topography, vegetation cover, buildings, wind towers, or other factors.

Based on the timing and strength of the wind gust, residue discharge control system 272 and/or route planning system 270 can generate outputs so that control signal generator 274 can generate control signals in anticipation of the arrival of the wind gust. Generating such control signals is indicated by block 446 in the flow diagram of FIG. 9. For instance, route generator 300 can alter the route of the harvester 100 so that the harvester 100 is oriented in a direction that will inhibit residue from landing in unharvested areas of the field when the wind gust arrives. Altering the route is indicated by block 448 in the flow diagram of FIG. 9.

In another example, residue subsystem speed/direction controller 308 can generate an output so control signal generator 274 controls the residue subsystem 138 to modify the direction, speed, degree of spread, or other characteristic of the residue as it exits harvester 100, when the wind gust arrives. Altering the residue subsystem 138 in anticipation of the wind gust is indicated by block 450 in the flow diagram of FIG. 9. A wide variety of other control signals can be generated in other ways as well to anticipate the arrival of the wind gust, as indicated by block 452 in the flow diagram of FIG. 9.

It can thus be seen that the present description describes a system that detects wind speed and/or wind direction at a harvester and generates control signals to inhibit or reduce the likelihood of residue from the harvester being discharged into unharvested areas of the field. A route planning system can plan the route of the harvester so that the residue is discharged in areas that have already been harvested. A residue discharge control system can control the discharge of residue by altering the speed at which residue is discharged from the harvester, and/or the trajectory and/or direction of discharge to avoid discharging the residue into unharvested areas of the field.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, they can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components. Also, some figures show flow diagrams. It will be appreciated that the order in which steps are executed can be changed and/or steps can be combined, split into more steps, and/or performed simultaneously. The order shown in the flow diagrams is shown for the sake of example only.

It will be noted that the above discussion has described a variety of different systems, components, analyzers, identifiers, generators, and/or logic. It will be appreciated that such systems, components, analyzers, identifiers, generators, and/or logic can be comprised of hardware items (such as processors and associated memory, or other processing components, some of which are described below) that perform the functions associated with those systems, components, analyzers, identifiers, generators, and/or logic. In addition, the systems, components, analyzers, identifiers, generators, and/or logic can be comprised of software that is loaded into a memory and is subsequently executed by a processor or server, or other computing component, as described below. The systems, components, analyzers, identifiers, generators, and/or logic can also be comprised of different combinations of hardware, software, firmware, etc., some examples of which are described below. These are only some examples of different structures that can be used to form the systems, components, analyzers, identifiers, generators, and/or logic described above. Other structures can be used as well.

Figure 10:
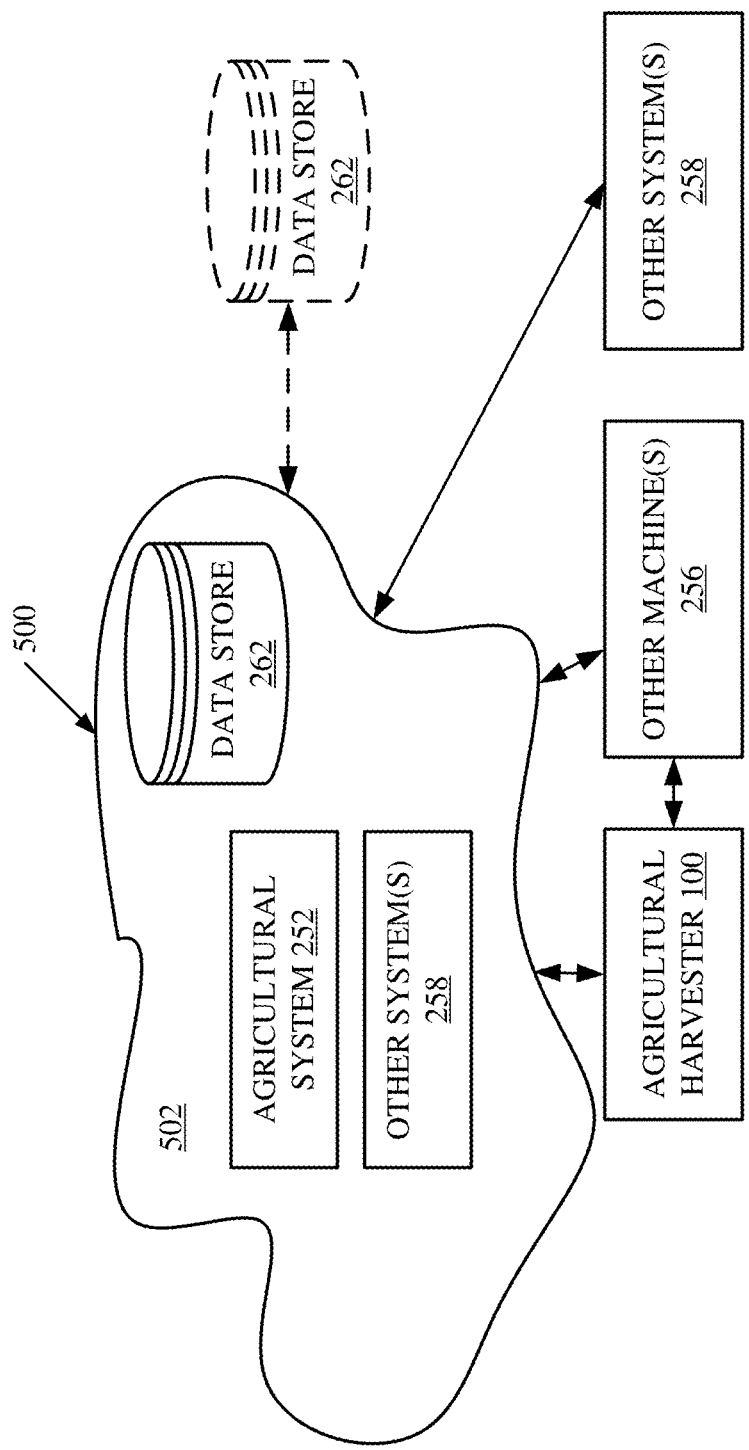
FIG. 10 is a block diagram showing one example of the agricultural system deployed in a remote server environment.

FIG. 10 is a block diagram of agricultural architecture 250, shown in FIG. 6, except that architecture 250 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 10, some items are similar to those shown in previous FIGS. and they are similarly numbered. FIG. 10 specifically shows that some or all of agricultural system 252 can be disposed on harvester 100, at a remote server location 502, or elsewhere. Therefore, harvester 100 accesses those systems through remote server location 502.

It is also contemplated that some elements of previous FIGS are disposed at remote server location 502 while others are not. By way of example, data store 262 can be disposed at a location separate from location 502, and accessed through the remote server at location 502. Regardless of where the items are located, the items can be accessed directly by harvester 100, through a network (either a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
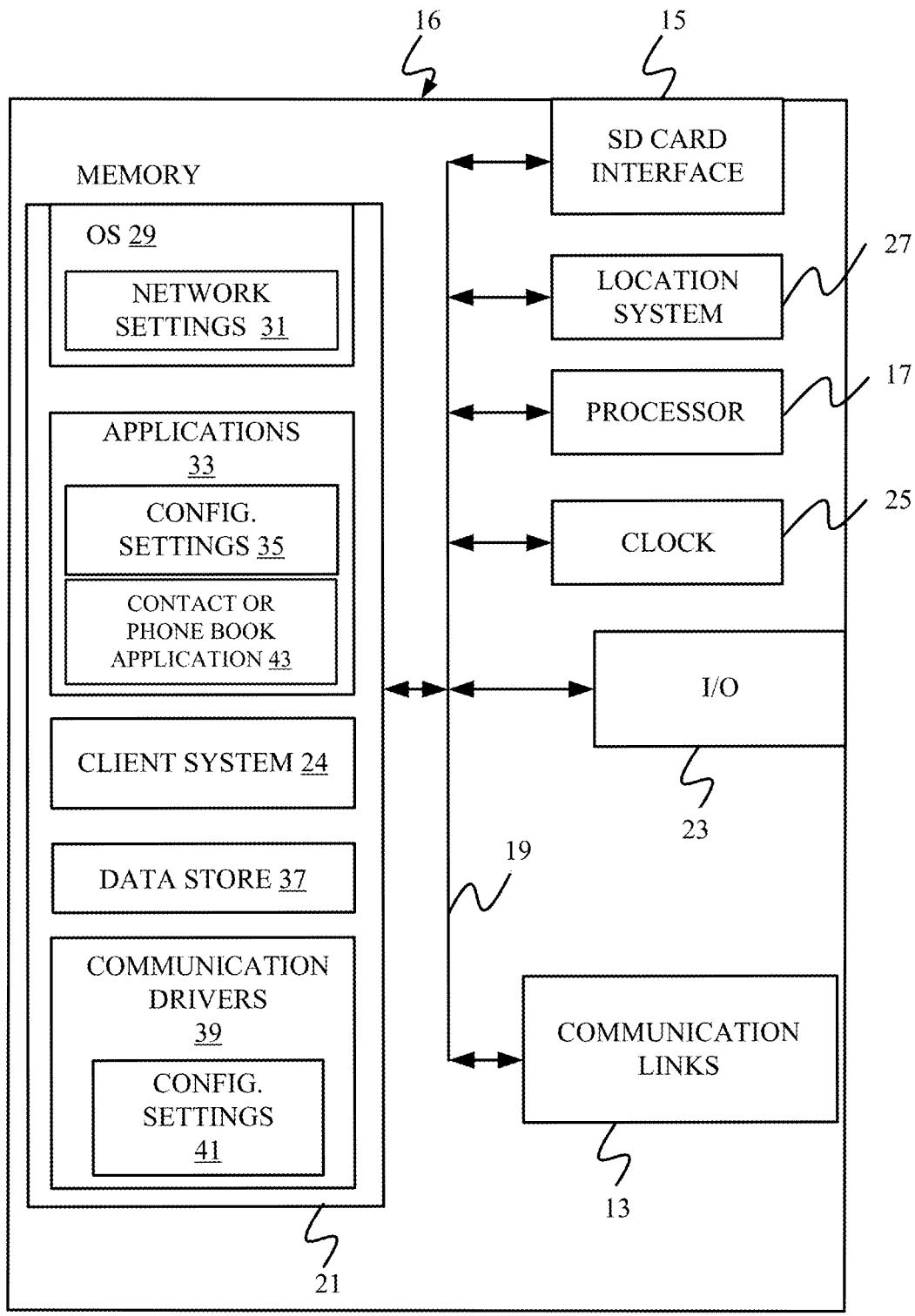
FIGS. 11, 12, and 13 are examples of mobile devices that can be used in the systems, machines and architectures described herein.
Figure 12:
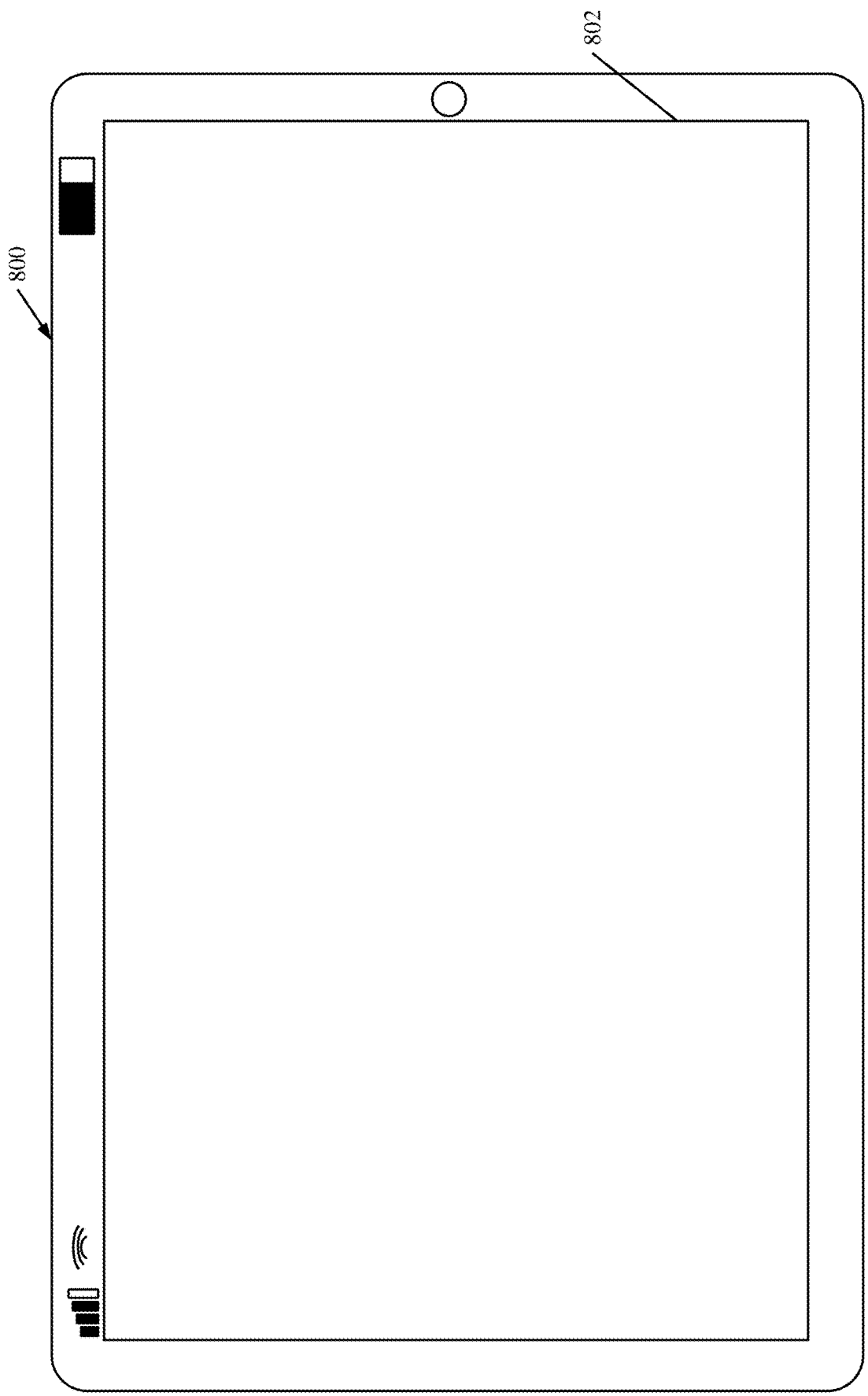
Figure 13:
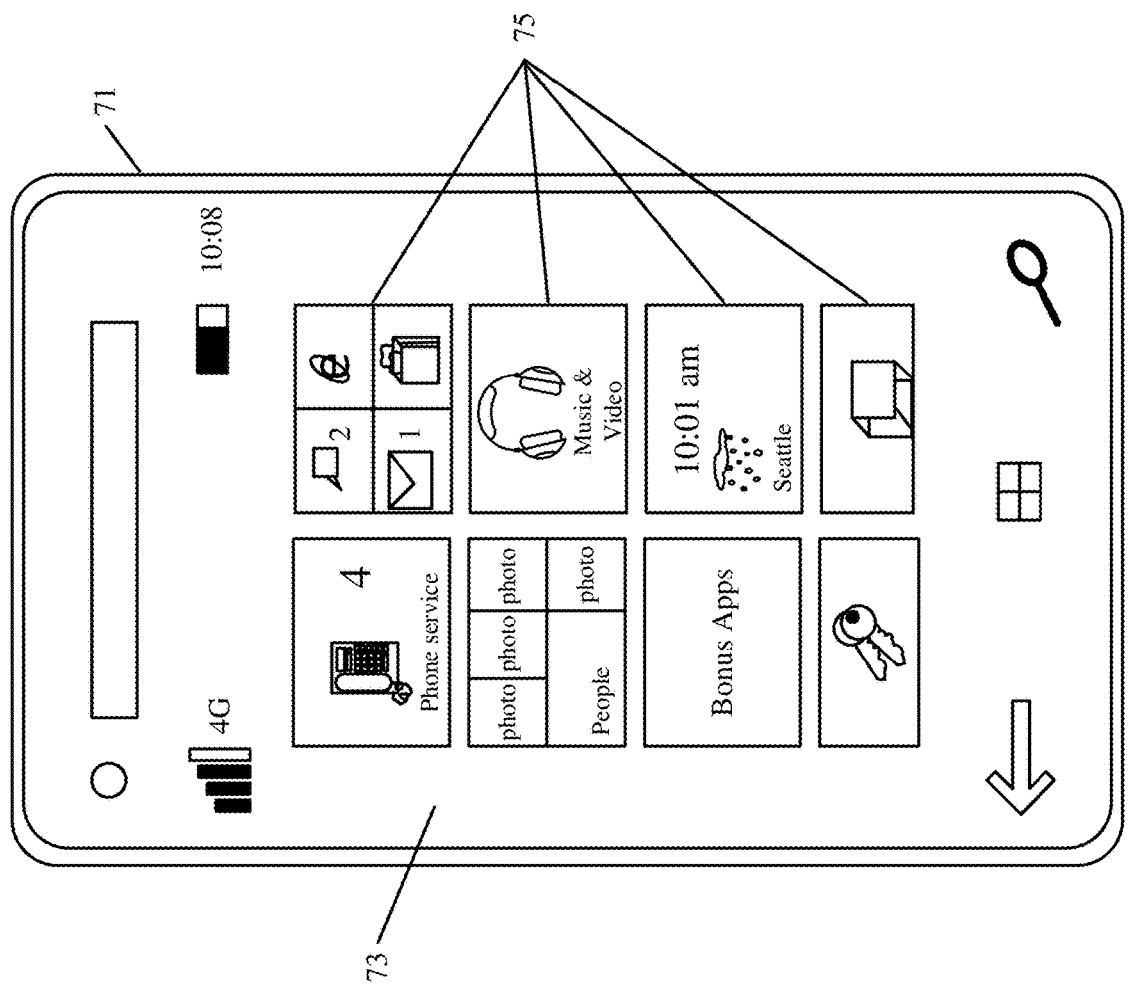

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 12-13 are examples of handheld or mobile devices.

FIG. 11 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows one example in which device 16 is a tablet computer 600. In FIG. 12, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 13 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
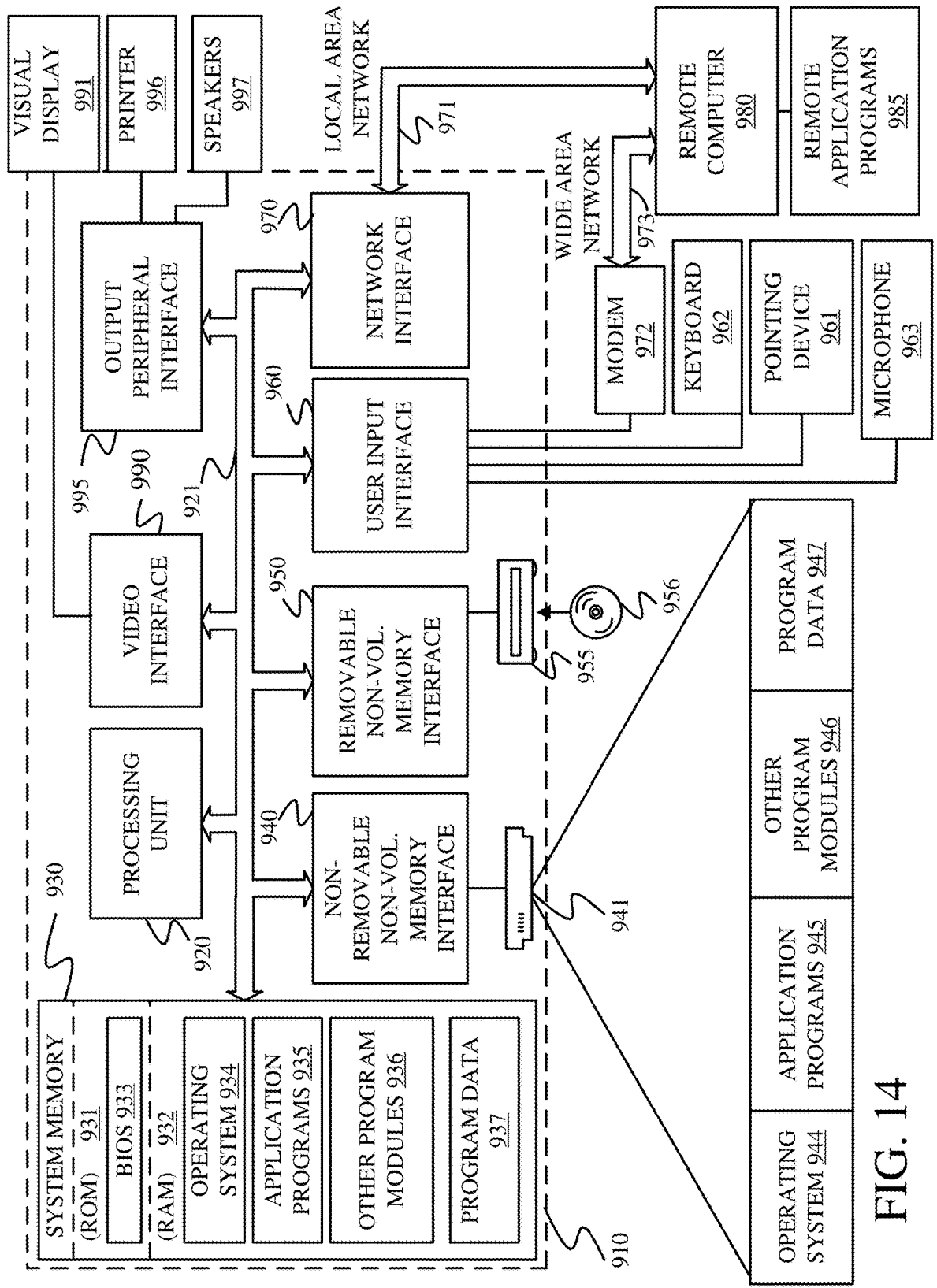
FIG. 14 is a block diagram of one example of a computing environment that can be used in the architectures, systems, and machines described elsewhere herein.

FIG. 14 is one example of a computing environment in which elements of previous FIGS., or parts of it, (for example) can be deployed. With reference to FIG. 14, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 14 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a harvester, the method comprising:
   detecting wind direction;
   identifying harvest coverage data for a field indicative of an unharvested location in the field; and
   generating a control signal to control the harvester to direct residue to areas of the field that have been harvested based on the wind direction and the harvest coverage data indicative of the unharvested location in the field.

2. The method of claim 1 wherein generating a control signal comprises:
generating a harvesting route based on the wind direction and coverage data; and
controlling the harvester to travel along the harvesting route.

3. The method of claim 1 wherein the harvester comprises a residue subsystem that discharges residue from the harvester and wherein generating a control signal comprises:
generating a residue subsystem control signal to control the residue subsystem.

4. The method of claim 3 wherein generating a residue subsystem control signal comprises:
generating the residue subsystem control signal to control a trajectory of residue as the residue exits the harvester.

5. The method of claim 1 and further comprising:
detecting a residue characteristic indicative of a landing point of residue after the residue is discharged from the harvester;
determining whether the residue is landing at a location in the unharvested location in the field based on the landing point; and
if so, adjusting the control signal based on the determination.

6. The method of claim 2 and further comprising:
sensing a crop characteristic indicative of crop height; and
generating the harvesting route based on the crop characteristic.

7. The method of claim 1 and further comprising:
detecting a location and heading of another agricultural vehicle and wherein generating a control signal comprises generating the control signal based on the location and heading of the other agricultural vehicle.

8. The method of claim 1 wherein detecting wind direction comprises:
detecting a first wind signal, indicative of a first wind direction, from a first weather station at a first location;
detecting a second wind signal, indicative of a second wind direction, from a second weather station at a second location; and
detecting the wind direction based on at least one of the first or second wind signals.

9. The method of claim 8 wherein detecting the wind direction based on at least one of the first or second wind signals, comprises:
selecting, as a selected weather station, the first or second weather station based on a location of the harvester and the first and second locations;
detecting the wind direction using the wind signal from the selected weather station.

10. The method of claim 8 wherein detecting the wind direction based on at least one of the first or second wind signals, comprises:
interpolating between the first wind signal and the second wind signal to obtain the wind direction at a location of the harvester.

11. The method of claim 1 wherein detecting wind direction comprises:
detecting a wind value at a location remote from the harvester; and
identifying timing information indicative of when the wind value will reach the harvester, wherein generating the control signal comprises generating the control signal based on the detected wind value and the timing information.

12. The method of claim 1 wherein detecting wind data comprises:
detecting the wind data with a wind sensor on the harvester.

13. The method of claim 9 wherein selecting the first or second weather station comprises:
selecting, as the selected weather station, a weather station closest to the harvester.

14. The method of claim 9 wherein selecting the first or second weather station comprises:
identifying a location of an obstruction relative to the first and second locations and relative to the location of the harvester; and
selecting the first or second weather station based on the location of obstruction relative to the first and second locations and relative to the harvester.

15. An agricultural system, comprising:
a wind processor configured to detect wind direction;
a coverage processor configured to identify harvest coverage data for a field indicative of an unharvested location in the field;
a controllable subsystem on a harvester; and
a control signal generator configured to generate a control signal to control the controllable subsystem on the harvester to direct residue to areas of the field that have been harvested based on the wind direction and the harvest coverage data.

16. The agricultural system of claim 15 wherein the controllable subsystem comprises a navigation subsystem, and further comprising:
a route planning system configured to generate a harvesting route based on the wind direction and coverage data, the control signal generator being configured to generate the control signal to control the navigation subsystem to navigate the harvester along the harvesting route.

17. The agricultural system of claim 15 wherein the controllable subsystem comprises a residue subsystem that discharges residue from the harvester and further comprising:
a residue discharge control system configured to identify a characteristic of the residue subsystem indicative of a landing point of the residue and wherein generating a control signal comprises generating a residue subsystem control signal to control the residue subsystem based on the landing point of the residue.

18. The agricultural system of claim 15 wherein the wind processor comprises:
a wind analyzer configured to detect a first wind signal, indicative of a first wind direction, from a first weather station at a first location and a second wind signal, indicative of a second wind direction, from a second weather station at a second location and to detect the wind direction based on at least one of the first or second wind signals.

19. The agricultural system of claim 18 wherein the wind processor further comprises:
a gust processor configured to detect a wind gust at a location remote from the harvester and to identify timing information indicative of when the wind gust will reach the harvester, wherein the control signal generator is configured to generate the control signal based on the detected wind gust and the timing information.

20. An agricultural harvester, comprising:
a wind sensor that generates a sensor signal;
a wind processor configured to detect wind direction based on the sensor signal;
a coverage processor configured to identify harvest coverage data for a field indicative of an unharvested location in the field;
a controllable subsystem on a harvester; and
a control signal generator configured to generate a control signal to control the controllable subsystem on the harvester to direct residue to areas of the field that have been harvested based on the wind direction and the harvest coverage data.

* * * * *